United States Patent [19]

de Vos

[11] Patent Number: 5,312,847

[45] Date of Patent: May 17, 1994

[54] POLYURETHANE FOAM CONTAINING A PARTICULATE ORGANIC SOLID AND A PROCESS FOR THE PREPARATION THEREOF

[75] Inventor: Hans de Vos, Terneuzen, Netherlands

[73] Assignee: The Dow Chemical Company, Midland, Mich.

[21] Appl. No.: 32,348

[22] Filed: Mar. 16, 1993

[51] Int. Cl.$^5$ .................. C08J 9/02; C08G 18/14; C08G 18/62

[52] U.S. Cl. .................. 521/137; 521/170; 521/174

[58] Field of Search ............. 521/137, 170, 174

[56] References Cited

U.S. PATENT DOCUMENTS

| | | |
|---|---|---|
| 2,993,013 | 7/1961 | Wolfe, Jr. . |
| 3,110,695 | 11/1963 | Ceresa .................. 260/45.5 |
| 3,304,273 | 2/1967 | Stamberger .................. 260/2.5 |
| 3,325,421 | 6/1967 | Muller .................. 252/308 |
| 3,385,351 | 5/1968 | Ralston .................. 165/48 |
| 3,441,523 | 4/1969 | Dwyer et al. . |
| 3,523,093 | 8/1970 | Stamberger .................. 260/2.5 |
| 3,563,946 | 2/1971 | Miller et al. .................. 260/29.7 |
| 3,598,772 | 8/1971 | Hood et al. .................. 260/2.5 |
| 3,600,340 | 8/1971 | Patton, Jr. et al. . |
| 3,699,340 | 10/1972 | Hick et al. .................. 260/183 R |
| 3,755,211 | 8/1973 | Fabris et al. . |
| 3,874,988 | 4/1975 | Buff et al. .................. 161/165 |
| 4,042,537 | 8/1977 | Dahm et al. .................. 260/2.5 |
| 4,049,590 | 9/1977 | Falkenstein et al. .................. 260/2.5 |
| 4,093,567 | 6/1978 | Hurwitz et al. .................. 260/79.3 |
| 4,119,586 | 10/1978 | Shah .................. 521/137 |
| 4,148,840 | 4/1979 | Shah .................. 521/137 |
| 4,158,087 | 12/1979 | Wood .................. 521/137 |
| 4,158,087 | 6/1979 | Wood . |
| 4,231,901 | 11/1980 | Berbeco .................. 521/137 |
| 4,278,770 | 7/1981 | Chandalia et al. .................. 521/99 |
| 4,282,331 | 8/1981 | Priest .................. 521/137 |
| 4,374,209 | 2/1983 | Rowlands .................. 521/167 |
| 4,452,920 | 6/1984 | Joubert . |
| 4,476,276 | 10/1984 | Gasper . |
| 4,950,694 | 8/1990 | Hager .................. 521/167 |
| 4,950,695 | 8/1990 | Stone .................. 521/157 |
| 4,981,880 | 1/1991 | Lehmann et al. .................. 521/174 |
| 5,114,989 | 5/1992 | Elwell et al. .................. 521/159 |

Primary Examiner—Morton Foelak

[57] ABSTRACT

A polyurethane foam containing a particulate organic polymer having a glass transition temperature of less than 0° C. and a process for preparing such foam is described. A preferred type of particulate organic polymer is a styrene/butadiene polymer. The presence of such particles within a flexible polyurethane foam significantly enhances both the comfort aspect and SAG factor performance of the foam.

18 Claims, 1 Drawing Sheet

POLYURETHANE FOAM CONTAINING A PARTICULATE ORGANIC SOLID AND A PROCESS FOR THE PREPARATION THEREOF

BACKGROUND OF THE INVENTION

This invention relates to polyurethane foam containing a certain particulate organic solid and a process for its preparation.

Polyurethane foam generally is prepared by reacting, in the presence of a blowing agent, a polyisocyanate with a polyahl such as polyester or polyether polyol. When preparing flexible polyurethane foam, typically the polyol has an equivalent weight of from about 500 to about 5000. In general such foam exhibits attractive physical properties, including tensile strength and tear resistance, but for some applications may be considered deficient with regard to load bearing properties and resilience.

It is known that the load bearing properties and resilience of a polyurethane foam may be enhanced by using fillers. Use of inorganic fillers such as aluminum silicate, calcium carbonate, kaolin, silica and carbon black to enhance the load bearing properties of flexible polyurethane foam is disclosed in U.S. Pat. Nos. 3,441,523; 3,598,772 and 4,278,770. The use of organic fillers including styrene-acrylonitrile (SAN), polyurea adduct(PHD), and polyisocyanatepolyamine (PIPA) products when preparing polyurethane foam is disclosed in U.S. Pat. Nos. 4,374,209; 3,325,421; 4,042,537; 4,093,567; 3,385,351; 3,304,273; 3,523,093 and 3,110,695. U.S. Pat. No. 3,755,211 discloses the preparation of polyurethane foam in the presence of an aqueous latex comprising a "hard" polymeric substance. By "hard" it is understood a polymeric substance having a glass transition temperature in excess of 50° C. Use of a substance with a glass transition of less than 50° C. is reported not to give the desired property improvements. BE Patent 836,259 discloses the use of, high glass transition temperature, reticulate styrene /acrylonitrile copolymer grafted on to polybutadiene as filler when preparing polyurethane foam. U.S. Pat. No. 3,699,340 discloses the preparation of polyurethane foam in the presence of a particulate polyethylene as filler and which is reported to have a glass transition temperature in excess of 50° C.

Despite the seemingly extensive knowledge and use of fillers in the preparation of the polyurethane foam there still exists a need to improve the general comfort properties of polyurethane foam and enhance its commercial usefulness. Particularly it would be desirable to enhance the "SAG" factor, or load bearing capacity, of polyurethane foam while maintaining or providing a better comfort. By "comfort" it is understood that the foam has a soft feeling and can easily adapt to the shape or configuration of the object resting on its load bearing surface.

The SAG factor is generally understood to be the ratio of the compression load deflection (CLD) or indentation load deflection (ILD) observed at 65% to that observed at 25% deflection. A SAG factor of from about 1.5 to about 2.5 is typical for flexible polyurethane foam. A higher SAG factor is generally associated with a polyurethane foam that provides more support. Use of the mentioned fillers can enhance the SAG factor of the foam to a limited extent but at the same time disadvantageously increases its hardness to the detriment of the overall comfort of the foam. Accordingly, it would be desirable to develop a foaming process which provides for foam having an enhanced SAG factor and which also provides a foam with a maintained or improved "comfort aspect".

SUMMARY OF THE INVENTION

Surprisingly, it is now found that such polyurethane foam may be obtained by use of a particulate organic solid which has a glass transition temperature of less than about 0° C.

In a first aspect, this invention is a process for preparing a polyurethane foam by contacting under reaction conditions an organic polyisocyanate with a polyahl in the presence of a blowing agent and a particulate organic polymer characterized in that the particulate organic polymer has a glass transition temperature of less than 0° C., with the proviso that when the polyisocyanate is toluene diisocyanate the polyahl, when a polyether polyol has a molecular weight of greater than 3000.

In a second aspect, this invention is a two component polyurethane foam-forming system, for use in the above mentioned process, which comprises:

a) a polyisocyanate, and
b) a polyahl composition comprising (i) a polyether polyol or polyester polyol of from about 1000 to about 12000 molecular weight, (ii) from about 1 to about 20 weight percent based on total weight of (a) and (b) of a particulate organic polymer which has a glass transition temperature of less than 0° C., and (iii) water in from about 1 to about 10 parts per 100 parts by total weight of (b), with the proviso that when the polyisocyanate is toluene diisocyanate the polyahl, when a polyether polyol, has a molecular weight greater than 3000.

In a third aspect, this invention is a polyurethane foam obtainable according to the above mentioned process.

Surprisingly it has been found that by incorporating into the polyurethane foaming process such a particulate organic polymer that an enhancement in the SAG factor in combination with an improved comfort aspect of the resulting foam is obtained compared to foam prepared in the absence of said particulate organic polymer. The foams of this invention, when flexible polyurethane foam, are suitable for many application areas including upholstery and cushioning such as bedding.

BRIEF DESCRIPTION OF THE DIAGRAMS

FIG. 1 is a general representation of a stress strain curve typical for a flexible polyurethane foam. The ratio of the indicated segments "gradient 5" and "gradient 40" defines the "comfort aspect" by which the foams of this invention may be characterized.

DETAILED DESCRIPTION OF THE INVENTION

Figure 1:
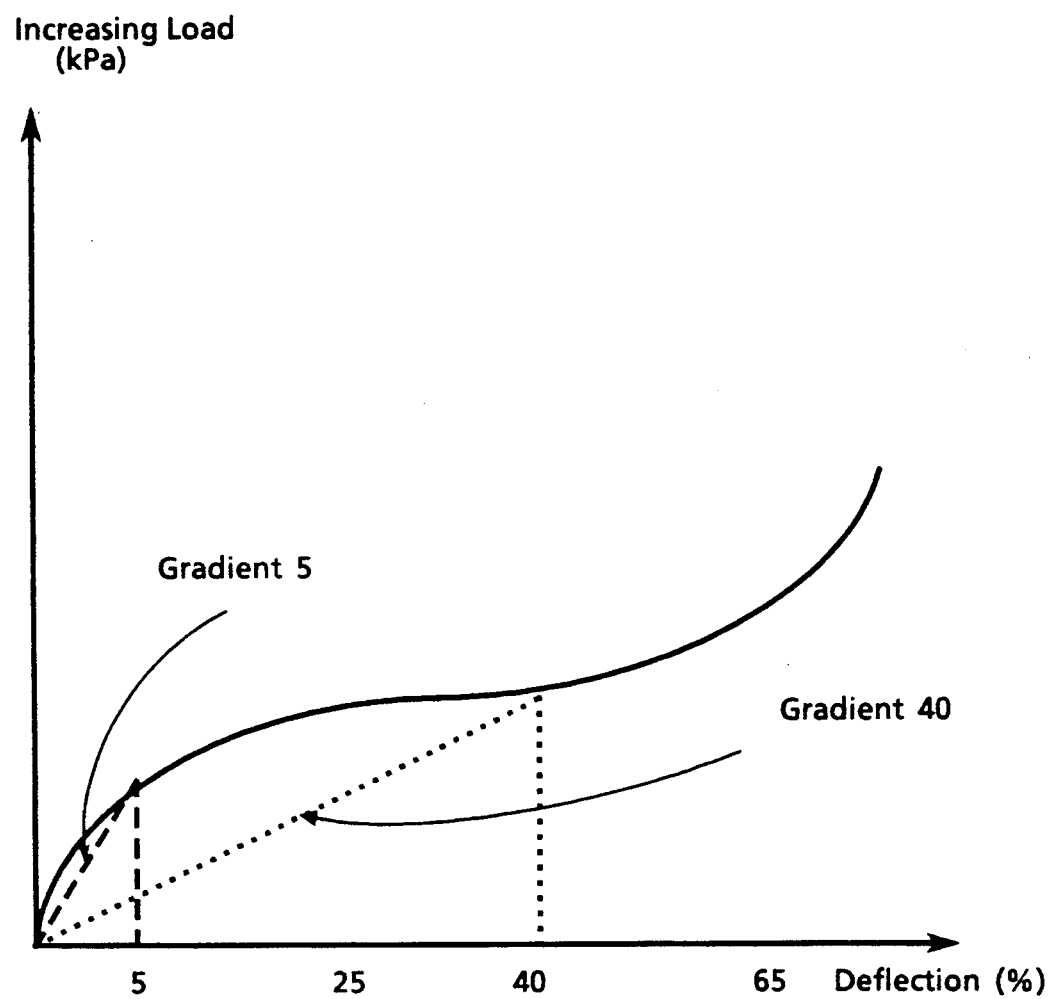

In accordance with this invention polyurethane, especially flexible, foam is prepared by contacting under reaction conditions a polyisocyanate with a polyahl in the presence of a blowing agent and a certain particulate organic polymer, sometimes identified hereinafter as "POP".

The "POP" has a glass transition temperature of less than 0° C., preferably less than about −25° C. and more preferably less than about −45° C. Advantageously, the glass transition temperature is at least −100° C., and more preferably at least −75° C. To facilitate the distribution of the "POP" within the polymer matrix of the polyurethane foam advantageously, the average size of the particle is less than about 0.5, preferably from about 0.085 to about 0.4, and more preferably from about 0.1 to about 0.3, micron. Suitable "POP" substances include natural rubber, isoprene, neoprene, polybutadiene, butadiene-styrene copolymer and copolymers of butadiene with acrylonitrile, methacrylonitrile or esters of acrylic acid or methacrylic acid or vinylpyridine. Preferred "POP" substances are natural rubber, vinylpyridine/butadiene, polybutadiene and especially styrene/butadiene polymers. Such substances, for the purposes of exhibiting the required glass transition temperature, advantageously are linear polymers substantially free of crosslinkage. By "substantially free" it is understood polymers where the degree of crosslinking is less than about 4, and preferably less than about 2 percent. In the case of the styrene-containing polymers to provide for the desired glass transition temperature it is advantageous to limit the styrene monomer content. Accordingly, preferred are substances where the styrene content advantageously is from about 5 to about 60, and preferably from about 20 to about 50 percent by total weight of the polymer; the balance of the polymer being made up by the other monomers present including especially butadiene. For the same reason, especially preferred over "block" polymers are those styrene-containing polymers where the styrene monomer is "randomly" distributed. Procedures for preparing a styrene/butadiene latex suitable for use in this invention are well known to those skilled in the art and documented by publications such as, for example, U.S. Pat. No. 3,563,946.

The "POP" is present in an amount sufficient to provide for the desired enhancement of the SAG performance in the resulting foam. Typically such amount is from about 1 to about 20, preferably from about 1 to about 10, and more preferably from about 3 to about 10, and most preferably from about 3 to about 8 weight percent based on total weight of the polyisocyanate and polyahl present. Generally such "POP" may be introduced into the foaming process as a dispersion, or latex, wherein the "POP" is the discontinuous phase. The continuous phase of the dispersion may be a polyahl or polyisocyanate but advantageously is water. When the continuous phase is a polyahl or Polyisocyanate, suitable and preferred substances are as discussed later. Typically such a latex will have a "POP" content of from about 20 to about 80, preferably from about 30, more preferably from about 40 and preferably up to about 75 more preferably up to about 70 weight percent based on its total weight. In a highly preferred embodiment of this invention the "POP" is a styrene/butadiene polymer introduced by way of an aqueous latex into the foaming process.

Exemplary of suitable aqueous styrene/butadiene latexes commercially available include those from Goodyear designated as LPF 6733A (understood to contain 35% styrene/65% butadiene), LPF 6758A (29% styrene/71% butadiene) and PLIOLITE 5356 (25% styrene/75% butadiene); products available from Enichem including those designated as INTEX 2003 (35% styrene/65% butadiene) and INTEX 132 (24% styrene/76% butadiene). Typically such commercial products are observed to have a solids content ranging from about 50 to about 75 weight percent; a particle size of from about 0.14 to about 0.3 micron; and a glass transition temperature of from about −75° C. to about −45° C.

The polyahl used to prepare the polyurethane foam advantageously comprises one or more substances bearing two or more active hydrogen atoms able to undergo reaction with an isocyanate group. Such substances include amines, amine-terminated polyoxyalkylenes, alcohols, especially polyester and more particularly polyether polyols. Notably suitable polyester and polyether polyols include those which have a molecular weight of from about 1000 to about 12000, preferably from about 3000, more preferably from about 4000, and preferably up to about 10000. If polyurethane foam is prepared from a polyisocyanate which is toluene diisocyanate, the polyahl, when a polyether polyol, has a molecular weight greater than 3000, preferably from at least 3300, and more preferably from at least 4000. Advantageously, such polyols have an average of from about 1.7 to about 4, and more preferably from about 2 to about 3 hydroxyl groups per molecule. The polyether polyol, may be a polyoxypropylene or a poly(oxypropylene-oxyethylene) polyol or a mixture thereof. The poly(oxypropyleneoxyethylene) polyol includes oxyethylene capped polyoxypropylene polyols and other random or block adducts obtained by reacting ethylene and propylene oxide with active hydrogen-containing initiators. Exemplary of suitable polyether polyols include those commercially available from The Dow Chemical Company under the trademark VORANOL, for example, VORANOL 4711, VORANOL 6001, VORANOL 3322 and VORANOL 1421. Polyether polyols having dispersed therein a particulate organic polymer which has a glass transition temperature greater than 0° C., preferably at least 25° C., may also be present. Suitable polyols containing such an organic polymer include styrene:acrylonitrile (SAN), polyurea (PHD), and polyisocyanate-polyamine (PIPA) type polymer polyols. Exemplary of suitable commercially available SAN polymer polyols include those sold by The Dow Chemical Company and include the products designated as VORANOL CP-8020, VORANOL CP-8010, VORANOL CP-8030, and products designated as VORALUX in conjunction with the designation codes HN200 through to HN206. Polyols having dispersed therein a particulate organic polymer which has a glass transition temperature greater than 0° C. when used in the process of this invention, are present in amounts such to provide from about 1 to about 20 percent, preferably from about 1 to about 10 weight percent, based on total weight of the polyisocyanate and polyahl present, of the said particulate organic polymer. Such a second particulate organic polymer is in addition to the "POP" as is present. Further, to the above mentioned polyahls also present can be N-H containing substances and monoalcohols the use of which to prepare polyurethane foam is disclosed in U.S. Pat. Nos. 4,981,880; 4,950,694 and 4,950,695.

The blowing agent comprises water in an amount of from about 1 to about 10, preferably from about 2.5 to about 8, and more preferably from about 3.5 to about 6.5 parts per 100 parts by total weight of polyahl. The blowing capacity provided for by water may be supplemented by physical blowing agents. Exemplary of such physical blowing agents include fluorocarbons and chlorofluorocarbons such as, for example, dichlorotrifluoroethane (R-123), dichlorofluoroethane (R-141a), chlorodifluoroethane (R-142b), tetrafluoroethane (R-134a), and chlorodifluoromethane (R-22); hydrocarbons such as butane, pentane, cyclopentane, hexane and cyclohexane; and entrained gases such as air, argon, nitrogen and carbon dioxide. In a highly preferred embodiment of this invention, the blowing agent consists essentially of water. Typically, the blowing agent is present in an amount to provide for a resulting polyurethane foam that has a density of from about 10 to about 250, preferably from about 15, more preferably from about 20, and most preferably from about 25, and preferably up to about 100, more preferably up to about 80 kg/m$^3$.

The polyisocyanate used to prepare the foam can be an aliphatic, or preferably an aromatic polyisocyanate, which has an average of at least 1.8, and preferably from about 1.9 to about 2.4 isocyanate groups per molecule. Suitable aromatic polyisocyanates include methylene diphenylisocyanate, urethane-modified methylene diphenylisocyanate, carbodiimide-modified methylene diphenylisocyanate, toluene diisocyanate, urethane-modified toluene diisocyanate, polymethylene polyphenyl polyisocyanate, or mixtures thereof. The methylene diphenylisocyanate (MDI) includes the 4,4'-, 2,4'-isomer and mixtures thereof. Preferred polyisocyanates are the methylene diphenylisocyanates and particularly urethane-modified methylene diphenylisocyanate compositions as described in U.S. Pat. No. 5,114,989, the teachings of which are incorporated herein by reference. It is advantageous for the SAG factor performance of the resulting foam, to use polyisocyanate mixtures which comprise 2,4'-methylene diphenylisocyanate, urethane-modified or carbodiimide-modified adducts of 2,4'-MDI in from at least 2, preferably from at least 8, more preferably from at least 15, and most preferably from at 20, and up to 50 weight percent of the total polyisocyanate. The amount of polyisocyanate present is such to provide for an isocyanate reaction index of typically from about 50 to about 125, preferably from about 60, more preferably from about 70, and preferably up to about 105, more preferably up to about 95. An isocyanate reaction index of 100 corresponds to one isocyanate group per isocyanate reactive hydrogen atom present from the polyahl and water.

Further to the above mentioned constituents, optionally present in the foaming process are other substances including urethane promoting catalyst, foam stabilizing agents and flame retardants. Foam stabilizing agents include silicon surfactants, for example, siloxane-oxyalkylene copolymers such as products sold under the trademark TEGOSTAB by Th. Goldschmidt including B-4113 and B-4690, and products sold by Dow Corning including the product designated as DC 5258. Suitable catalysts which may be used to promote the formation of urethane groups include tertiary amines and organometallic compounds especially tin compounds. Exemplary of tertiary amine compounds include N,N-dimethylcyclohexylamine, N,N-dimethylbenzylamine, N,N-dimethylethanolamine, bis(dimethylaminoethyl)ether and 1,4-diazobicyclo[2,2,2]octane; of tin compounds include stannous octoate and dibutyltin dilaurate. Combinations of amine and/or tin compounds as catalyst may advantageously be present. When it is desired to impart a degree of flame retardancy to the polyurethane foam present can be antimony-, phosphorus- or nitrogen-containing substances including for example, melamine, tris(chloroethyl)phosphonate or preferably halogen-free phosphorus compounds including for example triethylphosphate.

When preparing a polyurethane foam according to this invention, the polyisocyanate is contacted under reaction conditions with the polyahl in the presence of the blowing agent and the "POP". Advantageously, the polyahl, blowing agent and "POP" may be preblended prior to reacting with polyisocyanate. Suitable manufacturing procedures for flexible foam, including further description of optional additives that advantageously may be present, are such as described in, for example, "Polyurethanes Handbook" by Günter Oertel, Hanser Publishers, Munich, ISBN 0-02-948920-2 (1985); "Reaction Polymers" by W. Gum et al., Hanser Publishers, Munich, ISBN 3-446-15690-9 (1992); and U.S. Pat. No. 3,874,988.

The polyurethane foam, in addition to having a density as already discussed, advantageously has a compression load deflection (CLD) performance observed at 65% and 25% compression such that the ratio of CLD(65%): CLD(25%), or hereinafter SAG factor, is at least 2.8:1, preferably at least 3:1, more preferably at least 3.5:1, and most preferably from about 4:1 and up to about 9:1. The foam of this invention further advantageously exhibits a "comfort aspect" of 2.5 or less, preferably 2 or less, more preferably 1.5 or less, and most preferably 1 or less. A lower value of "comfort aspect" indicates a foam that is to be considered to have a more desirable feeling of comfort. In a highly preferred embodiment of this invention, advantageously MDI-based foam exhibits a SAG factor of from about 4.7 to about 9 with a "comfort aspect" of from about 0.5 to about 2; and advantageously TDI-based foam exhibits a SAG factor of from about 2.8 to about 9 with a "comfort aspect" of from about 0.5 to about 2.

For the purpose of this invention, the term "comfort aspect", with reference to FIG. 1, is defined as the ratio of gradient "5"/gradient "40";

where:
gradient 5 = load (kPa) at 5% deflection/5, and
gradient 40 = load (kPa) at 40% deflection/40

The invention is illustrated by the following examples in which all parts and percentages are by weight, unless otherwise stated. Where reported, properties of foams as obtained are observed according to the following test procedures; tensil strength and elongation - DIN 53571; compression load deflection (CLD)-DIN 53577; indentation load deflection (ILD)-DIN 53576; resilience - ASTM 3574-86.

The following listed substances are used to prepare polyurethane foam in the examples.

| | |
|---|---|
| Polyol A | VORANOL CP6001, a 6000 molecular weight glycerine-initiated polyoxypropylene-oxyethylene polyether polyol. |
| Polyol B | VORANOL CP1421, a 5000 molecular weight glycerine-initiated polyoxypropylene-oxyethylene polyether polyol. |
| Polyol C | VORANOL CP3322, a 3000 molecular weight glycerine-initiated polyoxypropylene-oxyethylene polyether polyol. |
| Polyol D | VORALUX HN204, a 4800 molecular weight glycerine-initiated polyoxypropylene-oxyethylene polyether polyol containing dispersed therein 15 wt % of a particulate styrene/acrylonitrile polymer (Tg: +110 to +120° C.). |
| Catalyst | a 3:1 weight ratio of DABCO 33LV, a proprietary amine catalyst available from |

-continued

| | |
|---|---|
| | Air Products, and NIAX A1, a proprietary amine catalyst available from Union Carbide Corporation. |
| Surfactant | DC 5258, a silicon-based surfactant available from Dow Corning. |
| MDI (70:30) | 4,4'-methylene diphenylisocyanate and 2,4'-methylene diphenylisocyanate in a weight ratio of 70:30. |
| MDI (50:50) | 4,4'-methylene diphenylisocyanate and 2,4'-methylene diphenylisocyanate in a weight ratio of 50:50. |
| TDI | 2,4-toluene diisocyanate and 2,6-toluene diisocyanate in a weight ratio of 80:20. |
| Prepolymer A | a urethane-modified methylene diphenylisocyanate composition with an NCO content of 29 weight percent obtainable as disclosed in U.S. Pat. No. 5,114,989. |

The aqueous latexes used, with a brief description of what they are understood to be, are given below.

| Latex | Solids (%) | Polymer | Particle size (microns) | Glass Transition Temp. (°C.) | pH |
|---|---|---|---|---|---|
| B | 50 | Polybutadiene | 0.24 | −70 | 12.1 |
| C | 66 | styrene (25%)/ butadiene (75%) | 0.23 | −50 | 9.8 |
| D | 66 | styrene (33%)/ butadiene (66%) | 0.24 | −47 | 9.7 |
| E | 70 | styrene (35%)/ butadiene (65%) | 0.25 | −50 | 12.6 |
| F | 70 | styrene (24%)/ butadiene (76%) | 0.23 | −48 | 9.9 |
| G | 70 | styrene (31%)/ butadiene (69%) | 0.24 | −48 | 12.2 |
| H | 70 | styrene (31%)/ butadiene (69%) | 0.23 | −47 | 9.8 |
| I | 60 | Prevulcanized natural rubber | 0.23 | −60 | 9.7 |

EXAMPLE 1

Flexible polyurethane foam is prepared, according to the formulation given in Table 1, by a handmix procedure in which the reactants are intimately mixed for 10 seconds at 3000 rpm and the resulting mixture poured into a box. In the comparative examples where no aqueous latex is present, an equivalent amount of water is independently introduced. Properties of the resulting free-rise foams as observed are reported in Table 1.

The properties reported in Table 1 clearly show the benefit to SAG factor and "comfort aspect" of foams containing the particulate organic polymer of low glass transition temperature. The enhancement of SAG factor performance typically being at least 25% and frequently 40% or more, compared to the SAG factor of similar foam prepared in the absence of said particulate organic polymer. The examples presented also show the advantage to using methylene diphenylisocyanate (MDI) over toluene diisocyanate (TDI). Further with reference to Foams 1 to 6, the desirability of using methylene diphenylisocyanates which have a greater 2,4'- MDI isomer content is shown. Foam 7, a TDI-based foam, when compared to Comparative Foams G, H and J illustrates the value of using the particulate polymer in combination with a polyether polyol of high molecular weight.

EXAMPLE 2

Polyurethane foams 8 to 22 are prepared, using a laboratory dispensing unit, by reacting Prepolymer A at differing isocyanate indices in the presence of different particulate organic polymers with an isocyanate reactive composition comprising,

| | |
|---|---|
| 100 parts | VORANOL CP6001 |
| 3.0 | Diethanolamine, 90 wt % in water |
| 0.8 | Surfactant, DC5258 |
| 0.15 | DABCO 33LV |
| 0.05 | NIAX A1 |
| varied to give constant reactivity | Stannous octoate |

The isocyanate reactive composition in each case contains a total of 3.5 parts water. Where foam is prepared in the presence of a particulate organic polymer in the form of a "latex", the amount of latex added is such to provide for this amount of water. Table 2 documents the reaction index and physical properties of the resulting free rise foams as observed. Different latexes at differing indices provide foam with a range of SAG factors and comfort aspects.

The significance of the SAG and comfort factor properties exhibited by the polyurethane foams of this invention can better be appreciated when compared to those of a typical polyolefin foam of density 70 kg/m3 prepared from a styrene/butadiene latex. In this case, such foam exhibits a SAG factor of 4.1; a comfort factor of 1.6; and resilience of 58%.

EXAMPLE 3

Polyurethane Foams 23-28 and Comparative Foam K are prepared using a Hennecke UBT high pressure foam dispenser unit operating with component temperatures of 23° C. and a polyol throughput of 25 kg/m3.

Foams 23 to 26 and Comparative K are obtained by reacting, at an isocyanate index of 105, Prepolymer A with the polyol formulation as given in Table 3; Foam 27 is similarly obtained by reacting TDI 80/20 with the given formulation. Some of the physical properties of the resulting foams are reported in Table 3. Foams 25 to 27 illustrate a flexible polyurethane containing, in addition to the POP, a styrene/acrylonitrile polymer. Foam 28 is prepared by reacting, at an isocyanate index of 95, Prepolymer A with the polyol formulation as given in Table 3, in the presence of Latex J. The "POP" of Latex J has a glass transition temperature of −15° C., and is understood to contain about 40% styrene, random distribution, and about 60% butadiene monomer with a 2% degree of crosslinking. Use of the Latex J, although still beneficial to the SAG and comfort aspect of the resulting foam, does not provide the same degree of enhancement as the other latexes with lower transition temperatures.

When combustion-modified foam properties are desired it is anticipated that similar performance is to be obtained by incorporating for example, a particulate melamine or a chlorinated rubber.

TABLE 1

| Foam 1 | Foam A* | Foam 2 | Foam B* | Foam 3 | Foam C* | Foam 4 | Foam D* |
|---|---|---|---|---|---|---|---|

TABLE 1-continued

|  | | | | | | | | |
|---|---|---|---|---|---|---|---|---|
| MDI (70:30) | 46.4 | 46.4 | 59.6 | 59.6 | 72.8 | 72.8 | / | / |
| MDI (50:50) | / | / | / | / | / | / | 46.4 | 46.4 |
| TDI | / | / | / | / | / | / | / | / |
| Index | 70 | 70 | 90 | 90 | 110 | 110 | 70 | 70 |
| Polyol A | 100 | 100 | 100 | 100 | 100 | 100 | 100 | 100 |
| Polyol B | / | / | / | / | / | / | 1 | 1 |
| Polyol C | / | / | / | / | / | / | / | / |
| Latex E | 10.7 | / | 10.7 | / | 10.7 | / | 10.7 | / |
| Water | / | 3.2 | / | 3.2 | / | 3.2 | / | 3.2 |
| Surfactant | 0.8 | 0.8 | 0.8 | 0.8 | 0.8 | 0.8 | 0.8 | 0.8 |
| Diethanolamine | 2.7 | 2.7 | 2.7 | 2.7 | 2.7 | 2.7 | 2.7 | 2.7 |
| Catalyst | 0.2 | 0.2 | 0.2 | 0.2 | 0.2 | 0.2 | 0.2 | 0.2 |
| Stannous Octoate | 0.2 | 0.2 | 0.2 | 0.2 | 0.2 | 0.2 | 0.2 | 0.2 |
| Density (kg/m$^3$) | 53.3 | 46.8 | 33.8 | 33.3 | 41.8 | 37.1 | 53.3 | 40.2 |
| Tensile Strength (kPa) | 58 | 65 | 67 | 68 | 116 | 120 | 56 | 68 |
| Elongation (%) | 151 | 158 | 170 | 125 | 86 | 75 | 155 | 160 |
| CLD at 40% (kPa) | 1.6 | 1.7 | 1.3 | 1.8 | 4.6 | 4.4 | 1.2 | 1.3 |
| Comfort Factor | 1.5 | 1.9 | 1.8 | 3.1 | 0.9 | 1.8 | 0.7 | 3.1 |
| SAG factor | 5.8 | 4.6 | 5.3 | 3.7 | 4.8 | 3.5 | 6.9 | 3.8 |
| % SAG factor enhancement | 26 | / | 43 | / | 37 | / | 81 | / |
| Wt. % particulate polymer in foam | 5.1 | 0 | 4.7 | 0 | 4.3 | 0 | 5.1 | 0 |

|  | Foam 5 | Foam E* | Foam 6 | Foam F* | Foam 7 | Foam G* | Foam H* | Foam J* |
|---|---|---|---|---|---|---|---|---|
| MDI (70:30) | / | / | / | / | / | / | / | / |
| MDI (50:50) | 59.6 | 59.6 | 72.8 | 72.8 | / | / | / | / |
| TDI | / | / | / | / | 40.8 | 40.8 | 47 | 47 |
| Index | 90 | 90 | 110 | 110 | 108 | 108 | 108 | 108 |
| Polyol A | 100 | 100 | 100 | 100 | 100 | 100 | / | / |
| Polyol B | 1 | 1 | 1 | 1 | / | / | / | / |
| Polyol C | / | / | / | / | / | / | 100 | 100 |
| Latex E | 10.7 | / | 10.7 | / | 8.0 | / | 8.0 | / |
| Water | / | 3.2 | / | 3.2 | / | 2.4 | / | 4.0 |
| Surfactant | 0.8 | 0.8 | 0.8 | 0.8 | 0.8 | 0.8 | 0.8 | 0.8 |
| Diethanolamine | 2.7 | 2.7 | 2.7 | 2.7 | 0.9 | 0.9 | 0.9 | 0.9 |
| Catalyst | 0.2 | 0.2 | 0.2 | 0.2 | 0.16 | 0.16 | 0.16 | 0.16 |
| Stannous Octoate | 0.2 | 0.2 | 0.2 | 0.2 | 0.2 | 0.2 | 0.2 | 0.2 |
| Density (kg/m$^3$) | 38.3 | 34.5 | 38.4 | 34.4 | 29 | 29.4 | 24 | 25 |
| Tensile Strength (kPa) | 62 | 80 | 85 | 54 | 63 | 67 | / | / |
| Elongation (%) | 170 | 190 | 117 | 90 | 111 | 128 | / | / |
| CLD at 40% (kPa) | 1.2 | 1.4 | 2.2 | 2.5 | 1.4 | 2.5 | / | / |
| Comfort Factor | 1.3 | 2.9 | 1.4 | 1.6 | 1.6 | 3.2 | / | / |
| SAG factor | 6.0 | 3.7 | 6.2 | 4.4 | 3.1 | 2.5 | 2.1 | 1.9 |
| % SAG factor enhancement | 62 | / | 41 | / | 24 | / | 10 | / |
| Wt. % particulate polymer in foam | 4.7 | 0 | 4.3 | 0 | 3.9 | 0 | 3.7 | 0 |

*Not an example of this invention

TABLE 2

| Foam | Latex | Index | Density (kg/m$^3$) | CLD at 40% (kPa) | SAG factor | Comfort factor | Resilience (%) |
|---|---|---|---|---|---|---|---|
| 8 | B | 75 | 40.8 | 1.49 | 4.7 | 3.2 | 60 |
| 9 |  | 100 | 37.7 | 2.18 | 4.3 | 2.5 | 59 |
| 10 | C | 72 | 44.8 | 3.46 | 4.8 | 2.8 | 60 |
| 11 | D | 73 | 46.1 | 3.36 | 4.3 | 2.4 | 61 |
| 12 |  | 79 | 50.0 | 1.38 | 5.3 | 2.3 | 54 |
| 12 | E | 82 | 49.5 | 1.21 | 6.6 | 0.7 | 48 |
| 13 |  | 115 | 35.9 | 1.7 | 5.0 | 1.9 | 55 |
| 14 | F | 81 | 44.9 | 0.96 | 8.4 | 1.2 | 54 |
| 15 |  | 103 | 53 | 1.81 | 7.4 | 0.9 | 54 |
| 16 |  | 91 | 40.5 | 1.88 | 4.5 | 2.5 | 54 |
| 17 | G | 97 | 40.9 | 1.88 | 4.5 | 2.5 | 54 |
| 18 |  | 104 | 40.3 | 2.37 | 4.6 | 2.0 | 57 |
| 19 | H | 72 | 43.9 | 1.59 | 4.7 | 3.0 | 55 |
| 20 |  | 85 | 40.9 | 1.77 | 4.6 | 2.7 | 54 |
| 21 |  | 97 | 40.8 | 2.36 | 4.8 | 2.3 | 58 |
| 22 | I | 85 | 52.8 | 3.36 | 4.8 | 1.9 | 59 |

TABLE 3

|  | Foam 23 | Foam 24 | Foam K* | Foam 25 | Foam 26 | Foam 27 | Foam 28 |
|---|---|---|---|---|---|---|---|
| Polyol A | 100 | 100 | 100 | / | / | / | 100 |

TABLE 3-continued

|  | Foam 23 | Foam 24 | Foam K* | Foam 25 | Foam 26 | Foam 27 | Foam 28 |
|---|---|---|---|---|---|---|---|
| Polyol D | / | / | / | 100 | 100 | 100 | / |
| Latex D | / | 10.5 | / | 10.5 | 6.9 | 10.5 | / |
| Latex E | 10.5 | / | / | / | / | / | / |
| Latex J | / | / | / | / | / | / | 6.8 |
| Water | / | / | 3.5 | / | 1.15 | / | 3.5 |
| Diethanolamine | 3.15 | 3.15 | 3.15 | 3.15 | 3.15 | 3.15 | 3.15 |
| Catalyst | 0.2 | 0.2 | 0.2 | 0.2 | 0.2 | 0.2 | 0.2 |
| Stannous Octoate | 0.2 | 0.2 | 0.2 | 0.2 | 0.2 | 0.2 | 0.4 |
| Surfactant | 0.8 | 0.8 | 0.8 | 0.8 | 0.8 | 0.8 | 0.8 |
| Density (kg/m$^3$) | 40.6 | 42.2 | 38 | 38.7 | 41.7 | 24.9 | 40.1 |
| Tensile Strength (kPa) | 59 | 95 | 111 | 133 | 101 | 118 | 64 |
| Elongation (%) | 84 | 73 | 99 | 71 | 80 | 157 | 100 |
| CLD at 40% (kPa) | 2.0 | 3.6 | 3.8 | 5.4 | 3.9 | 1.7 | 3.0 |
| Comfort Factor | 1.0 | 1.0 | 3.3 | 2.6 | 1.1 | 1.3 | 2.5 |
| SAG Factor | 4.5 | 4.3 | 3.0 | 4.3 | 3.9 | 3.1 | 3.1 |

*Not an example of this invention

What is claimed is:

1. A process for preparing a polyurethane foam by contacting under reaction conditions an organic polyisocyanate with a polyahl, in the of a blowing agent and from about 1 to about 20 weight percent based on total weight of polyisocyanate and polyahl of a particulate organic polymer having a glass transition temperature of less than 0° C., with the proviso that when the polyisocyanate is toluene diisocyanate the polyahl, when a polyether polyol, has a molecular weight of greater than 3000.

2. The process of claim 1 wherein the particulate organic polymer has a glass transition temperature of less than −25° C.

3. The process of claim 1 wherein the particulate organic polymer is styrene/butadiene, vinylpyridine/butadiene, polybutadiene, acrylonitrile/butadiene, isoprene, neoprene, or natural rubber.

4. The process of claim 3 wherein the particulate organic polymer is a styrene/butadiene polymer consisting of from about 5 to about 60 weight percent styrene and from about 40 to about 95 weight percent butadiene.

5. The process of claim 1 wherein the polyisocyanate is present in an amount to provide for and an isocyanate reaction index of from about 50 to about 125.

6. The process of claim 1 wherein the particulate organic polymer is introduced as an aqueous dispersion.

7. The process of claim 6 wherein the aqueous dispersion contains the particulate organic solid in from about 20 to about 80 weight percent based on total weight including particulate organic solid.

8. The process of claim 7 wherein the particulate organic solid is a styrene/butadiene polymer, that consists of from about 20 to about 50 weight percent styrene and from about 50 to about 80 weight butadiene, which has a glass transition temperature of from about −75° C. to about −25° C.

9. The process of claim 1 wherein the particulate organic polymer is a styrene/butadiene polymer which has a glass transition temperature of from about −75° C. to about −25° C. and consists of from about 20 to about 50 weight percent styrene and from about 50 to about 80 weight percent butadiene.

10. The process of claim 9 wherein the particulate organic polymer is introduced as an aqueous dispersion which contains the particulate organic solid in from about from about 20 to about 80 weight percent based on total weight of the dispersion including the particulate organic polymer.

11. The process of claim 5 wherein the polyisocyanate comprises methylene diphenylisocyanate, a urethane-modified methylene diphenylisocyanate, or a carbodiimide-modified methylene diphenylisocyanate, or mixtures thereof.

12. The process of claim 5 wherein the polyisocyanate is toluene diisocyanate or a urethane-modified toluene diisocyanate and the polyahl, when a polyether polyol, has a molecular weight of at least 4000.

13. A two component polyurethane foam-forming system, for use in the above mentioned process, which comprises:
   a) a polyisocyanate, and
   b) a polyahl composition comprising (i) a polyether polyol or polyester polyol of from about 1000 to about 12000 molecular weight, (ii) from about 1 to about 20 weight percent based on total weight of (a) and (b) of a particulate organic polymer which has a glass transition temperature of less than 0° C., and (iii) water in from about 1 to about 10 parts per 100 parts by total weight of (b), with the proviso that when the polyisocyanate is toluene diisocyanate the polyahl, when a polyether polyol, has a molecular weight greater than 3000.

14. The polyurethane foam-forming system of claim 13 wherein: (a) is toluene diisocyanate, a urethane-modified toluene diisocyanate, methylene diphenylisocyanate, a urethane-modified methylene diphenylisocyanate, a carbodiimide-modified methylene diphenylisocyanate or mixtures thereof; (b)(ii), the particulate organic polymer, consists of from about 5 to 50 weight percent styrene and from about 50 to 95 weight butadiene, and has a glass transition temperature of from about −75° C. to about −25° C.; and (b)(iii) is present in from about 2 to about 8 parts per 100 parts by weight of the polyahl.

15. A polyurethane foam obtained according to the process of claim 1.

16. The foam of claim 15 which exhibits a SAG factor of at least 2.8, and a comfort aspect of less than 2.5.

17. A process for preparing a polyurethane foam by contacting under reaction conditions an organic polyisocyanate with a polyahl in the presence of a water and a particulate organic polymer characterized in that the particulate organic polymer has a glass transition temperature of less than 0° C. and is a styrene/butadiene, polybutadiene, neoprene, isoprene, vinylpyridine/-butadiene, acrylonitrile/butadiene or natural rubber, with the proviso that when the polyisocyanate is toluene diisocyanate the polyahl, when a polyether polyol, has a molecular weight of greater than 3000.

18. A process for preparing a polyurethane foam by contacting under reaction conditions an organic polyisocyanate with a polyahl in the presence of a water and a particulate organic polymer characterized in that:

a) the particulate organic polymer has a glass transition temperature of less than 0° C.; and
b) the polyisocyanate, present in an amount to provide an isocyanate reaction index of from about 50 to about 125, comprises methylene diphenylisocyanate, a urethane-modified methylene diphenylisocyanate, or a carbodiimide-modified methylene diphenylisocyanate, or mixtures thereof.

* * * * *